Nov. 15, 1949  C. F. JENSKY ET AL  2,488,198
PORTABLE FOOD STORAGE COMPARTMENT FOR
MECHANICAL REFRIGERATORS
Filed Aug. 31, 1948
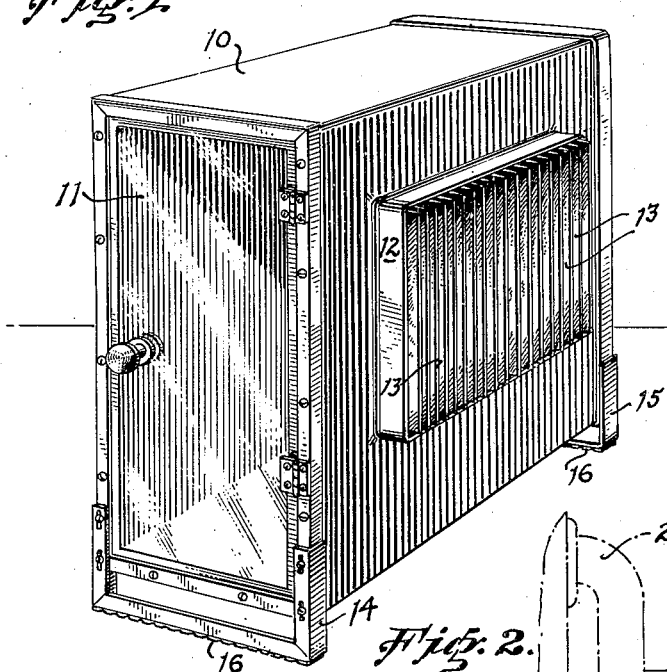
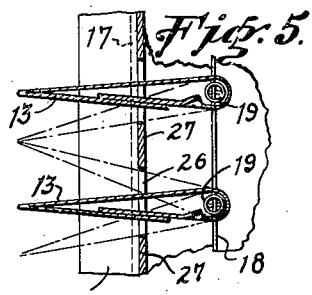
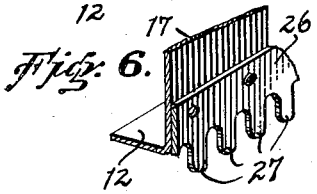
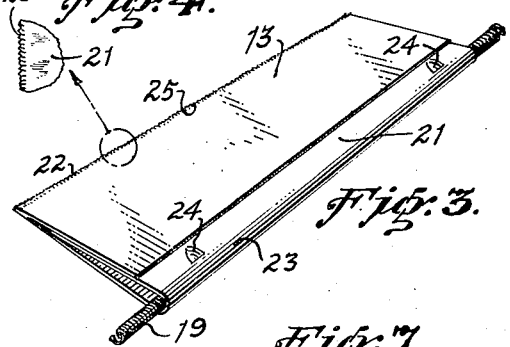
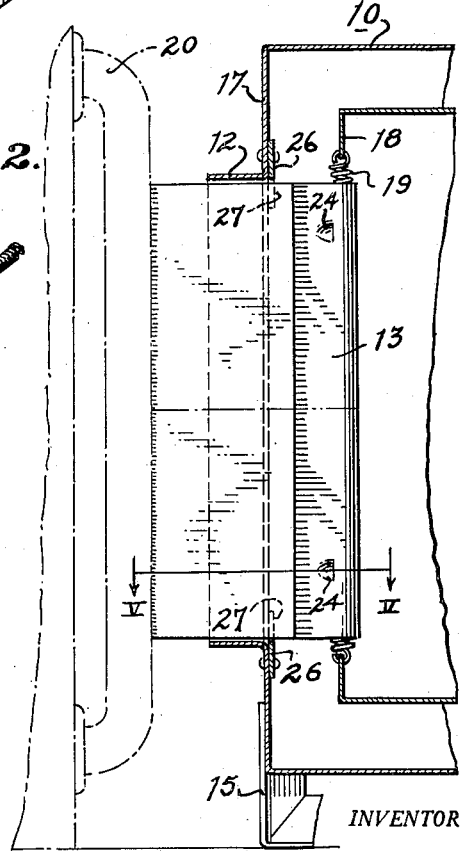
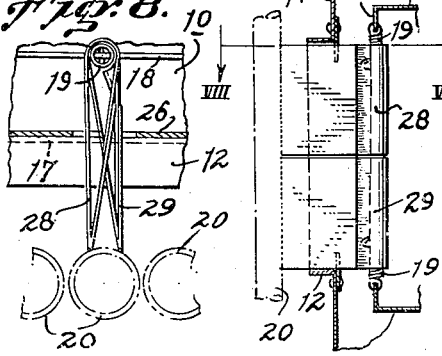
INVENTOR.
CLARENCE F. JENSKY &
BY YANCY L. WILLIAMS
ATTORNEY Patented Nov. 15, 1949

2,488,198

UNITED STATES PATENT OFFICE 2,488,198

PORTABLE FOOD STORAGE COMPARTMENT FOR MECHANICAL REFRIGERATORS

Clarence F. Jensky, Palo Alto, and Yancy L. Williams, Santa Clara, Calif., assignors to Technical Products Co., Palo Alto, Calif., a copartnership Application August 31, 1948, Serial No. 46,976

13 Claims. (Cl. 62—89)

1

The present invention relates generally to home refrigeration and more specifically to an improved heat transfer means for a frozen food storage cabinet or compartment of the character described and claimed in a co-pending application, Serial No. 717,979, filed December 23, 1946 by Clarence F. Jensky, one of the joint inventors herein.

An object of our invention is to provide a novel and improved form of heat transfer means for establishing a refrigerating connection between a portable food storage compartment and a stationary mechanical refrigeration producing unit.

Another object of our invention is to provide an improved heat transfer means that will be found particularly adapted for use in establishing a heat transferring connection between a mechanically operating refrigeration unit and a food storage compartment positioned adjacent thereto.

Another object of the invention is to provide a novel heat transferring fin and a mounting therefor by which a plurality of said fins may be supported in spaced parallel relation for free pivotal and lateral movement to establish a uniform heat transferring connection with an irregular heat absorbing member of a mechanical refrigeration producing unit.

We have discovered that in associating a portable frozen food storage compartment with a mechanical refrigerating unit in the manner contemplated by our invention that it is desirable to establish as complete a mechanical contact between the exposed surface of a heat absorbing evaporator of a refrigeration unit as is possible, and it is therefore a further object of our invention to provide a heat transferring means employing heat conducting fins in which the individual fins are mounted so that they may adjust themselves with respect to each other and thus insure a full contact of each of the fins with any conventional type of irregular surfaced heat absorbing evaporator of a mechanical refrigerating temperature producing unit and without the danger of one or more of the fins by their contact with the heat absorbing evaporator preventing a contact between said evaporator and the remaining heat transferring fins associated therewith.

Other objects and advantages of our invention will be in part evident to those skilled in the art and in part pointed out hereinafter in connection with the accompanying drawing, wherein there is shown by way of illustration and not of limitation a preferred embodiment of the invention.

2

In the drawing:

Figure 1 is a perspective view showing our invention as applied to a portable frozen food storage compartment of the character described and claimed in the above identified co-pending application for patent, Figure 2 is a fragmentary vertical sectional view showing the manner in which the heat transfer fins are arranged and mounted in accordance with our invention, Figure 3 is a perspective view showing one of our improved fins with its supporting means, Figure 4 is a magnified fragmentary view showing a detail of the fin of Figure 3.

Figure 5 is a fragmentary sectional view taken along line V—V of Figure 2, looking in direction of arrows, Figure 6 is a fragmentary perspective view showing a further detail of the invention, Figure 7 is a vertical sectional view similar to Figure 3 showing a modified fin arrangement, and Figure 8 is a fragmentary sectional view taken along line VIII—VIII of Figure 7 looking in direction of arrows.

For a better understanding of our invention reference is now made to the following description taken together with the single sheet of drawing, wherein we have shown our improvement as applied to a frozen food storage chest, or compartment, of the type contemplated by the aforementioned co-pending application for patent. In this showing the food storage chest or compartment, designated by the numeral 10, is of rectangular outline and at one end it has an opening with a hinged door 11 of transparent material through which frozen food packages and the like may be inserted and withdrawn from the interior thereof. As will hereinafter appear the chest or compartment 10, is of double wall construction and extending over a considerable area at one side it has a cold air circulating duct which is framed by an outwardly extending flange 12. Disposed within this cold air circulating duct there is a plurality of vertically extending heat conducting fins 13 that are adapted and arranged to make a heat transferring contact with the heat absorbing evaporator of a mechanical refrigerating temperature producing unit of any conventional type. This cold air circulating duct, defined by the outwardly extending flange 12, will preferably be of an area comparable to the exposed heat absorbing surface at the side of the mechanical refrigerating temperature producing unit with which the chest of compartment 10 may be associated. In order to provide for a vertical adjustment of this cold air circulating duct with respect to the heat absorbing evaporator of such a refrigerator unit we have shown the compartment 10 as having supports 14 and 15 that are adjustably secured at the front and back ends of the compartment 10. In addition, to prevent any sidewise shifting of the chest or compartment 10, which might result in a breaking of contact between the heat conducting fins 13 and the heat absorbing evaporator with which they may be associated, the adjustable supports 14 and 15 are each shown as having a corrugated rubber facing 16 which when placed upon the grill-like shelf of a refrigerator will serve to hold the chest or compartment 10 in a position where, after being established, contact between the fins 13 and the heat absorbing evaporator of a mechanical refrigerating unit will be maintained.

By now referring to Figure 2 of the drawing it will be seen that the food storage chest or compartment 10 has an outer encircling wall 17 and an inner space defining wall 18 between which cooling air may freely circulate when the compartment is in use. The outer wall 17 is also here shown as having a rectangular opening about which the flange 12 extends as a framing member and the inner wall 18 has a similar rectangular but somewhat larger opening across which there is stretched a plurality of spiral springs 19 that pass through and serve as a support at the inner edge of the heat conducting fins 13. With this type of mounting the fins 13 will be free to adjust themselves with respect to each other when the food storage chest or compartment unit 10 is placed in a refrigerator with the fins 13 in contact with the exposed coils or irregular surface of the heat absorbing evaporator of a refrigerating temperature producing unit. In this figure of the drawing the fins 13 are shown as positioned against a refrigerator unit having exposed coils, designated by the numeral 20, and here shown by dot and dash lines. When positioned in this manner the heat contained within the compartment unit 10 and within the space between its outer and inner walls 17 and 18 thereof will be transmitted by the fins 13 to the heat absorbing coils 20 and as a result the temperature within the space defined by the inner wall 18 of the compartment 10 will be reduced in an amount sufficient to maintain any frozen foods placed therein in a frozen condition.

While the fins 13 may take various forms and may be of solid construction, we prefer a fin of hollow construction, and to this end, as illustrated in Figure 3, our preferred form for the fin 13 contemplates a folding of a rectangular sheet of metal upon itself so as to form an airfoil cross-section having a passageway longitudinally therethrough. As illustrated, this sheet of metal, designated by the numeral 21, is folded sharply at one point to form a knife-like edge 22 at the outer edge of the fin and at its other edge it is folded loosely so as to form a rounded edge 23 through which one of the fin supporting springs may be passed as here shown. In order to secure the fins 13 upon the supporting springs 19 we have shown indentations 24 that may be formed on each side of the fin adjacent the supporting spring 19 where they will serve to lock the fin 13 upon its supporting spring 19. Another feature of our fin, which is more clearly shown in Figure 4 of the drawing, resides in the provision of a knurling 25 along the knife-like edge 22 of the fin. This knurling has the advantage that it provides a roughened surface which will greatly facilitate the formation of frost and consequently a good heat transfer contact between each of the heat conducting fins 13 and the heat absorbing evaporator of a mechanical refrigerating temperature producing unit.

As is shown in Figures 5 and 6, and with reference back to Figure 2 of the drawing, it will be noted that the outer wall of the compartment 10 carries two oppositely disposed comb-like members 26 that have teeth or projections 27 which are adapted to extend in the duct opening between the adjacent fins 13. These teeth or projections 27 upon the comb-like members 26 are of such width that they will limit the pivotal or swinging motion of the individual fins 13 and thus hold them against any extreme pivotal movement which might result in a loss of contact with the heat absorbing evaporator of the refrigerating unit.

In Figures 7 and 8 we have shown a further modification in the construction of the heat transferring fins in which each of the supporting springs 19 are shown as carrying two individual fins 28 and 29 that are arranged in axial alignment one above the other. In this arrangement the two fins 28 and 29 will in effect operate as a single fin, but since its two parts may pivot individually of each other, as shown in Figure 8 of the drawing, these two parts 28 and 29 of the fin may engage with different points along the heat absorbing evaporator with which they are brought into contact and thus a good heat transferring contact is insured.

In explaining the operation of our improvement it should be pointed out that the particular food storage compartment 10, constructed as here illustrated, is designed primarily for use with household mechanical refrigerators of the type that is not equipped with a built-in deep freeze or frozen food storage compartment which operates independently of the remaining space of the refrigerator. One of the principal advantages of a food storage compartment, such as is here described, resides in the fact that the compartment or chest may be placed into a conventional refrigerator when there is frozen food to be preserved and can be removed from the refrigerator when not required and when removed it will leave the space normally occupied thereby for the storage of other foods not requiring a freeze maintaining temperature. When the food storage compartment 10 is inserted in a refrigerator equipped with a mechanical refrigerating temperature producing unit it will be placed upon the upper shelf or other support immediately at one side of the refrigeration unit and against its exposed heat absorbing evaporator so that the fins 13 will be brought into slight pressure engagement with the surface thereof. To maintain this close contact the corrugated padding 16 carried by the supports 14 and 15 will be positioned upon the grill forming wires of the shelf so that the fins supporting springs 19 will be stretched slightly and exert a slight pressure through the fins 13 which will establish a good contact with the heat absorbing evaporator of the refrigeration unit. Under these conditions as soon as the compartment 10 has been placed in position and assuming that it has foodstuffs from which heat is to be withdrawn a circulation will be immediately set up between the interior thereof and the heat absorbing evaporator of the refrigeration unit. Now if moisture is present, which is generally the case with frozen food packages, a slight frost will immediately form on the fins 13. This frosting process will further serve to provide a good heat transfer connection and will be facilitated by the knurling 22 at the edges of the fins. In extreme cases this frosting may continue along the fins toward the freezing compartment and in this manner the heat absorbing evaporator of the refrigeration unit may be said to be increased so as to include this additional area provided by the individual fins 13. Then while in operation the difference in temperature between the air, both within the main portion of the refrigerator and the space between the inner and outer walls 17 and 18 of the compartment 10, will cause a circulation of air which in addition to flowing between the several fins will also flow therethrough and as a consequence a cooling temperature considerably below that existing in the remaining portion of the refrigerator will be established within the food storage compartment 10.

While we have, for the sake of clearness and in order to disclose the invention so that the same can be readily understood, described and illutrated specific devices and arrangements, we desire to have it understood that this invention is not limited to the specific means disclosed, but may be embodied in other ways that will suggest themselves to persons skilled in the art. It is believed that this invention is new and all such changes as come within the scope of the appended claims are to be considered as part of this invention.

Having thus described our invention, what we claim and desire to secure by Letters Patent is:

1. In a refrigerating system of the character described, the combination of a mechanical refrigerator unit having an exposed irregular surfaced heat absorbing member, a portable refrigerating compartment adapted to be positioned adjacent said refrigerator unit and having spaced walls with an opening through said spaced walls at one side thereof for the transfer of heat from its interior, and a plurality of heat conducting fins pivotally mounted upon one of said spaced walls and extending through the opening in the other of said walls of the refrigerating compartment adapted when said refrigerating compartment is in use to individually engage with the irregular surface of the heat absorbing member of said refrigerator unit and conduct heat from the interior of said refrigerating compartment to the heat absorbing member of said refrigerator unit.

2. In a refrigerating system of the character described, the combination of a mechanical refrigerator unit having a heat absorbing member with a vertically disposed wall, a portable refrigerating compartment adapted to be positioned adjacent said refrigerator unit and having double walls between which a circulation of air may pass, the outer one of said double walls having an opening in one side thereof for the transfer of heat from its interior, and a plurality of heat transfering fins pivotally mounted upon the inner one of said double walls and extending through said opening in the outer one of said double walls of the refrigerating compartment adapted when said refrigerating compartment is in use to pivot and individually engage with the vertically disposed wall of said heat absorbing member of said refrigerator unit and transfer heat from the space between said double walls and the interior of said refrigerating compartment to the heat absorbing member of said refrigerator unit.

3. In a refrigerating system of the character described, the combination of a mechanical refrigerator unit having an irregular surfaced heat absorbing member, a portable refrigerating compartment of double walled construction adapted to operate adjacent said refrigerator unit, the double walls of said compartment having aligned openings at one side of said compartment for the transfer of heat from its interior, a plurality of heat conducting fins disposed in and extending through the opening in the outer one of said double walls, and means carried by the inner one of said double walls forming a flexible support for each of said fins, whereby said fins may individually adjust themselves to engage with different points along the irregular surface of said heat absorbing member and conduct heat through said opening from the interior of said refrigerating compartment to the heat absorbing member of said refrigerator unit.

4. A portable freezing and frozen food storage compartment for refrigerators of the type having a mechanical refrigerating unit with an exposed heat absorbing coil extending along a side thereof, comprising a double walled rectangular compartment forming unit having a door at one end providing access to the interior thereof, an air circulating duct extending outwardly from the outer wall of said compartment forming unit, a plurality of heat transferring fins extending vertically in spaced relation within said air circulating duct and with the spaces therebetween in communication with the space between the double walls of said compartment forming unit, said duct and said heat transferring fins being extended outwardly from one side of said compartment forming unit and adapted when said unit is placed adjacent the refrigerator unit to encompass a portion of its exposed heat absorbing coil, and means for supporting said heat transferring fins for free pivotal and lateral movement within said duct to establish individual heat transferring contacts between said fins and the heat absorbing coil of said refrigerator when said compartment is positioned adjacent thereto.

5. A portable frozen food storage compartment for refrigerators of the type having a mechanical refrigerating unit with an exposed and irregular surface extending along a side thereof, comprising a double walled rectangular compartment forming unit having a door at one end providing access to the interior thereof, a cold air circulating duct extending outwardly from and including a major portion of the outer wall at one side of said unit, a plurality of heat transferring fins arranged vertically in spaced relation within said duct with the spaces therebetween in communication with the space between the double walls of said compartment forming unit, said heat transferring fins being extended outwardly from said duct and adapted when said unit is placed within a refrigerator to make contact with a portion of the exposed and irregular surface of its mechanical refrigerating unit, and a resilient mounting means for supporting each of said heat transferring fins for free movement with respect to each other, whereby each of said fins may establish a heat transferring contact with a portion of the exposed and irregular surface of said mechanical refrigerator unit.

6. In a portable frozen food storage compartment of the character described, the combination of a storage compartment having spaced inner and outer walls between which a circulation of cooling air may be established, said compartment having aligned openings at one side through its inner and outer walls, a plurality of tension springs secured in spaced parallel relation across said latter opening, and a plurality of heat conducting fins extending outwardly through the opening in the outer wall of said compartment and each supported at their inner ends by one of said tension springs, whereby said fins may individually adjust themselves to establish a good heat transfer contact with a mechanical refrigerating unit when said compartment is positioned in a refrigerator adjacent its mechanical refrigerating unit.

7. In a portable frozen food storage compartment of the character described, the combination of a storage compartment having spaced inner and outer walls between which a circulation of cooling air may be established, said compartment having aligned rectangular openings at one side extending through its inner and outer walls, the opening in the outer wall of said compartment being defined by a flange extending therearound and the vertical dimension of the opening in the inner wall being slightly greater than the corresponding dimension of the opening in the outer wall, a plurality of tension springs arranged in spaced parallel relation and attached at their ends to the top and bottom edges of the opening in said inner wall, and a plurality of folded sheet metal fins extending outwardly through the opening in the outer wall of said compartment and through the inner end of each of which one of said tension springs is projected as a means for supporting said fins in vertically spaced and movable relationship with each other within said openings, whereby said fins may individually adjust themselves to establish a good heat transfer contact with the heat absorbing coil of a mechanical refrigeration producing unit when said compartment is positioned in a refrigerator.

8. In a portable frozen food storage compartment of the character described, the combination of a storage compartment having spaced inner and outer walls between which a circulation of cooling air may be established, said compartment having aligned openings at one side through its inner and outer walls, a plurality of tension springs secured in spaced parallel relation across said latter opening, a plurality of heat conducting fins extending outwardly through the opening in the outer wall of said compartment and each supported at their inner ends by one of said tension springs, whereby said fins may individually adjust themselves to establish a good heat transfer contact with the heat absorbing coil of a mechanical refrigerating unit when said compartment is positioned in a refrigerator adjacent its mechanical refrigeration producing unit, and means carried by the outer wall of said compartment and disposed between each of said fins for limiting the lateral movement thereof and preventing a contact therebetween.

9. The combination as set forth in claim 6 in which the heat conducting fins are formed of a plurality of parts axially arranged along their supporting tension springs to insure a continuous vertical contact with the heat absorbing surface of a refrigeration producing unit.

10. In a heat transfer system of the character described, the combination of a food storage chest, a plurality of metallic fins extending from one side of said chest adapted and arranged to be placed with their extending edges in physical contact with the heat absorbing coil of a refrigeration temperature producing evaporator, said fins being characterized by a knurling along the evaporator engaging edges thereof.

11. In a heat transfer system of the character described, the combination of a food storage chest for use in a mechanical refrigerator, a plurality of metallic fins extending from one side of said chest adapted and arranged to be placed with their extending edges in physical contact with the heat absorbing coil of a refrigeration temperature producing evaporator, and means for pivotally securing said fins upon the side of said storage chest, whereby said fins may pivot individually to establish contact with said heat absorbing coil.

12. A heat conducting fin for a refrigerating system of the character described, comprising a sheet of metal folded upon itself to form an elongated fin of substantially airfoil cross-section having one edge folded tightly and knurled, and its other edge loosely folded to provide a space for a longitudinally extending supporting member, and having spaced indentations for retaining a supporting member in an operative position therein.

13. In a heat conducting fin for a refrigerator unit of the character described, the combination of a flat sheet of metal folded upon itself to form a hollow fin of airfoil cross-section, and a spiral spring extending longitudinally through said fin at its wide edge, said spring having loops at its ends by which it may be secured to a support and said sheet of metal being indented to retain said fin in a fixed position upon said spring.

CLARENCE F. JENSKY.
YANCY L. WILLIAMS.

REFERENCES CITED

The following references are of record in the file of this patent:

UNITED STATES PATENTS

| Number | Name | Date |
|---|---|---|
| 1,948,681 | Sawyer | Feb. 27, 1934 |
| 2,163,182 | Warren | June 20, 1939 |
| 2,234,862 | Genczi | Mar. 11, 1941 |
| 2,284,293 | Mills | May 26, 1942 |
| 2,291,736 | Lindblom | Aug. 4, 1942 |
| 2,302,385 | Anderson | Nov. 17, 1942 |
| 2,414,588 | Elliott | Jan. 21, 1947 |
| 2,432,931 | Peltier | Dec. 16, 1947 |
| 2,444,887 | Wyeth | July 6, 1948 |